US010009814B1

(12) United States Patent
Jones et al.

(10) Patent No.: US 10,009,814 B1
(45) Date of Patent: Jun. 26, 2018

(54) MULTI-MODE MOBILE STATION AND METHOD OF CHANGING ITS NETWORK CONNECTIVITY USING A NETWORK ACKNOWLEDGEMENT

(71) Applicant: Sprint Spectrum L.P., Overland Park, KS (US)

(72) Inventors: Bryce A. Jones, Overland Park, KS (US); Jason R. Delker, Olathe, KS (US); John M. Everson, Parker, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 153 days.

(21) Appl. No.: 14/927,629

(22) Filed: Oct. 30, 2015

Related U.S. Application Data (63) Continuation of application No. 10/933,596, filed on Sep. 3, 2004, now abandoned.

(51) Int. Cl.
| | |
|---|---|
| *H04W 4/00* | (2018.01) |
| *H04W 36/14* | (2009.01) |
| *H04W 36/00* | (2009.01) |
| *H04W 60/04* | (2009.01) |
| *H04W 60/06* | (2009.01) |
| *H04W 36/30* | (2009.01) |

(Continued)

(52) U.S. Cl.
CPC ......... *H04W 36/14* (2013.01); *H04L 65/1006* (2013.01); *H04W 12/06* (2013.01); *H04W 36/0005* (2013.01); *H04W 36/30* (2013.01); *H04W 36/32* (2013.01); *H04W 60/04* (2013.01); *H04W 60/06* (2013.01); *H04W 84/04* (2013.01); *H04W 84/12* (2013.01); *H04W 88/06* (2013.01)

(58) Field of Classification Search
USPC .............................. 455/436, 437–439, 452.1
See application file for complete search history.

(56) References Cited

U.S. PATENT DOCUMENTS

| | | | |
|---|---|---|---|
| 5,020,092 A | 5/1991 | Phillips et al. | |
| 5,020,093 A | 5/1991 | Pireh | |

(Continued)

FOREIGN PATENT DOCUMENTS

GB 2288301 A 10/1995

OTHER PUBLICATIONS

Office Action, dated Jan. 6, 2011, from U.S. Appl. No. 10/927,271.

(Continued)

*Primary Examiner* — Charles Shedrick (57) ABSTRACT

A multi-mode mobile station includes a first interface for communicating with a first wireless network, such as a wireless wide area network (WWAN), and a second interface for communicating with a second wireless network, such as a wireless local area network (WLAN). While the multi-mode mobile station has a first connection with the first wireless network, the multi-mode mobile station establishes a second connection with the second wireless network. When the second connection is established, the second wireless network transmits an acknowledgement signal to the multi-mode mobile station. In response to the acknowledgment signal, the multi-mode mobile station disables the first connection with the first wireless network and powers down the first interface.

17 Claims, 3 Drawing Sheets

(51) Int. Cl.
*H04W 36/32* (2009.01)
*H04L 29/06* (2006.01)
*H04W 12/06* (2009.01)
*H04W 88/06* (2009.01)
*H04W 84/04* (2009.01)
*H04W 84/12* (2009.01)

(56) References Cited

U.S. PATENT DOCUMENTS

| | | | |
|---|---|---|---|
| 5,289,527 A * | 2/1994 | Tiedemann, Jr. | H04W 60/04 342/450 |
| 5,550,895 A | 8/1996 | Burson et al. | |
| 5,594,782 A | 1/1997 | Zicker et al. | |
| 5,640,686 A | 6/1997 | Norimatsu | |
| 5,737,703 A | 4/1998 | Byrne | |
| 5,754,542 A | 5/1998 | Ault et al. | |
| 5,870,673 A | 2/1999 | Haartsen | |
| 5,943,621 A | 8/1999 | Ho et al. | |
| 5,983,109 A | 11/1999 | Montoya | |
| 5,987,334 A | 11/1999 | Kaku | |
| 5,966,667 A | 12/1999 | Halloran et al. | |
| 6,006,106 A | 12/1999 | Cook et al. | |
| 6,011,978 A | 1/2000 | Ault et al. | |
| 6,088,590 A | 7/2000 | Anderson et al. | |
| 6,108,533 A | 8/2000 | Brohoff | |
| 6,112,088 A | 8/2000 | Haartsen | |
| 6,125,283 A | 9/2000 | Kolev et al. | |
| 6,198,941 B1 | 3/2001 | Aho et al. | |
| 6,201,963 B1 | 3/2001 | Nakamura | |
| 6,304,761 B1 | 10/2001 | Tsunehiro | |
| 6,317,582 B1 | 11/2001 | Yoshinaga | |
| 6,400,961 B1 | 6/2002 | Lillie et al. | |
| 6,438,117 B1 | 8/2002 | Grilli et al. | |
| 6,445,912 B1 | 9/2002 | Cole et al. | |
| 6,456,858 B1 | 9/2002 | Streter | |
| 6,463,298 B1 | 10/2002 | Sorenson et al. | |
| 6,498,939 B1 | 12/2002 | Thomas | |
| 6,526,034 B1 | 2/2003 | Gorsuch | |
| 6,680,923 B1 | 1/2004 | Leon | |
| 6,804,532 B1 | 12/2004 | Moon et al. | |
| 6,895,255 B1 | 5/2005 | Bridgelall | |
| 6,922,559 B2 | 7/2005 | Mohammed | |
| 6,990,598 B2 | 1/2006 | Sherburne, Jr. | |
| 7,039,027 B2 | 5/2006 | Bridgelall | |
| 7,114,010 B2 | 9/2006 | Karaoguz et al. | |
| 7,139,587 B2 | 11/2006 | Ishii | |
| 7,142,882 B2 * | 11/2006 | Schmidt | H04M 1/725 455/41.2 |
| 7,149,521 B2 | 12/2006 | Sundar et al. | |
| 7,200,397 B1 | 4/2007 | Jones et al. | |
| 7,277,710 B1 | 10/2007 | Jones et al. | |
| 7,443,817 B2 * | 10/2008 | Farnham | H04W 48/18 370/329 |
| 2001/0036830 A1 | 11/2001 | Wu et al. | |
| 2002/0027891 A1 | 3/2002 | Mimura | |
| 2002/0039892 A1 * | 4/2002 | Lindell | H04W 48/18 455/151.1 |
| 2002/0059453 A1 | 5/2002 | Eriksson et al. | |
| 2002/0085516 A1 | 7/2002 | Bridgelall | |
| 2002/0132628 A1 | 9/2002 | Matsumoto et al. | |
| 2002/0147008 A1 | 10/2002 | Kallio | |
| 2002/0173303 A1 | 11/2002 | Shibutani | |
| 2002/0191575 A1 | 12/2002 | Kalavade et al. | |
| 2003/0003869 A1 | 1/2003 | Fujii | |
| 2003/0017842 A1 | 1/2003 | Moles et al. | |
| 2003/0039242 A1 | 2/2003 | Moore, Jr. | |
| 2003/0091021 A1 | 5/2003 | Trossen et al. | |
| 2003/0118015 A1 | 6/2003 | Gunnarsson et al. | |
| 2003/0134636 A1 | 7/2003 | Sundar et al. | |
| 2003/0224795 A1 | 12/2003 | Wilhoite et al. | |
| 2004/0030791 A1 | 2/2004 | Dorenbosch et al. | |
| 2004/0114553 A1 | 6/2004 | Jiang et al. | |
| 2004/0176024 A1 | 9/2004 | Hsu et al. | |
| 2004/0176101 A1 | 9/2004 | Shoki et al. | |
| 2004/0203789 A1 | 10/2004 | Hammond et al. | |
| 2004/0203791 A1 | 12/2004 | Pan et al. | |
| 2004/0264414 A1 | 12/2004 | Dorenbosch | |
| 2005/0119005 A1 | 6/2005 | Segal et al. | |

OTHER PUBLICATIONS

Office Action, dated Nov. 10, 2008, in U.S. Appl. No. 10/927,271.
Office Action, dated Jun. 8, 2009, in U.S. Appl. No. 10/927,271.
Office Action, dated Nov. 18, 2009, in U.S. Appl. No. 10/927,271.
Office Action, dated May 4, 2010, in U.S. Appl. No. 10/927,271.
Office Action from U.S. Appl. No. 10/927,271, dated Dec. 31, 2007.
Office Action, dated Jan. 9, 2007, for U.S. Appl. No. 10/934,011.
M. Ylianttila, et al., "Handoff Procedure for Heterogeneous Wireless Networks," Global Telecommunications Conference—Globecom 1999, pp. 2783-2787.
R. Chakravorty, et al., "Vertical handoffs with Mobile IPv6," University of Cambridge Computer Laboratory, Technical Report, May 2003.
R. Chakravorty, et al., "On Inter-network Handover Performance using Mobile IPv6," Cambridge Open Mobile System, Technical Report, Jun. 2003.
N. Hoaison, et al., "Personal Mesh: A Design of Flexible Internet Access for Personal Area Network," The International Symposium on Wireless Personal Multimedia Communications, Oct. 2003.
Office Action, dated Apr. 12, 2011, in U.S. Appl. No. 10/927,271.
M. Handley et al., "SDP: Session Description Protocol," Request for Comments 2327, Network Working Group, Apr. 1998.
J. Rosenberg et al., "SIP: Session Initiation Protocol," Request for Comments 3261, Network Working Group, Jun. 2002.
A. Vemuri et al., "Session Initiation Protocol for Telephones (SIP-T): Context and Architectures," Request for Comments 3372, Network Working Group, Sep. 2002.

* cited by examiner

MULTI-MODE MOBILE STATION AND METHOD OF CHANGING ITS NETWORK CONNECTIVITY USING A NETWORK ACKNOWLEDGEMENT

CROSS-REFERENCE TO RELATED APPLICATION

This application is a continuation of patent application Ser. No. 10/933,596, filed Sep. 3, 2004, which is hereby incorporated herein by reference.

BACKGROUND

1. Field of the Invention

The present invention relates to telecommunications and, more particularly, to a multi-mode mobile station and method for changing the network connectivity of the multi-mode mobile station.

2. Description of Related Art

There is an increased interest in using more diverse types of wireless access technologies for mobile devices. Different wireless access technologies may be used to provide wireless coverage in different geographic areas. In addition, different wireless access technologies may be used to provide different capabilities for transmitting and receiving voice, data, and/or other media. For example, wireless wide area networks (WWANs), which often use wireless access technologies such as CDMA, TDMA, or GSM, typically provide wireless coverage in relatively large geographic areas. However, in many cases, WWANs do not provide good wireless coverage in buildings. In addition, many WWANs have a relatively limited bandwidth for transmitting and receiving media. However, wireless local area networks (WLANs), which may use wireless access technologies, such as 802.11x, Bluetooth, HiperLAN, and Multichannel Multipoint Distribution Service (MMDS), have been used to provide wireless coverage in more limited areas, such as the inside of buildings. In addition, WLANs can often transmit and receive media at a higher rate than many WWANs.

With this increased interest in using diverse wireless access technologies to provide wireless coverage has come an increased interest in providing multi-mode mobile stations that can communicate using more than one type of wireless access technology. For example, a multi-mode mobile station may have one interface for communication with a WWAN, using a wireless access technology such as CDMA, and another interface for communication with a WLAN, using a wireless access technology such as 802.11x. Accordingly, there is a need to coordinate the operations of different types of wireless access technologies to facilitate changing the network connectivity of multi-mode mobile stations, i.e., to go from a WWAN to a WLAN or vice versa.

SUMMARY

In a first principal aspect, an exemplary embodiment of the present invention provides a method of changing network connectivity for a multi-mode mobile station. The multi-mode mobile station includes a first interface for communicating with a first wireless network using a first wireless access technology and a second interface for communicating with a second wireless network using a second wireless access technology. While the multi-mode mobile station has a first connection with the first wireless network, the multi-mode mobile station establishes a second connection with the second wireless network. The first connection uses the first interface and the first wireless access technology, and the second connection uses the second interface and the second wireless access technology. When the second connection is established, the multi-mode mobile station receives an acknowledgement signal from the second wireless network. In response to the acknowledgement signal, the multi-mode mobile station disables the first connection and powers down the first interface.

In a second principal aspect, an exemplary embodiment of the present invention provides a multi-mode mobile station comprising a first interface for communicating with a first wireless network using a first wireless access technology, a second interface for communicating with a second wireless network using a second wireless access technology, and a controller for controlling the first and second interfaces. When the multi-mode mobile station establishes a second connection with the second wireless network and receives an acknowledgement signal from the second wireless network, the controller disables the first connection and powers down the first interface.

DETAILED DESCRIPTION OF EXEMPLARY EMBODIMENTS

The present invention facilitates the use of diverse wireless access technologies by providing a method for changing the network connectivity of a multi-mode mobile station. The multi-mode mobile station includes a plurality of interfaces for wireless communication using a plurality of different wireless access technologies. Each interface may include a radio frequency (RF) transceiver and/or a communication module for a particular wireless access technology. The different wireless access technologies may involve different frequency bands, modulation schemes, multiplexing schemes, and/or protocols. In addition, the different wireless access technologies could be used to communicate with different types of wireless networks, such as WWANs and WLANs, or they could be used to communicate with the same wireless network. In an exemplary embodiment, the multi-mode mobile station has a first interface for wireless communication with a WWAN using CDMA and a second interface for wireless communication with a WLAN, e.g., using 802.11x. However, in other embodiments, the multi-mode mobile station may have more than two interfaces, may use other types of wireless access technologies, and may communicate with wireless networks other than WWANs and WLANs.

The multi-mode mobile station may change its network connectivity when it has a first connection with a first wireless network and determines that a second wireless network is available. The first connection with the first wireless network uses a first interface and a first wireless access technology. To change its network connectivity, the multi-mode mobile station may power up a second interface and establish a second connection to the second wireless network, using the second interface and a second wireless access technology. When the second network is established, the second wireless network transmits an acknowledgement signal to the multi-mode mobile station. In response to the acknowledgement signal, the multi-mode mobile station may disable the first connection with the first wireless network and power down the first interface.

1. EXEMPLARY NETWORK ARCHITECTURE

Figure 1:
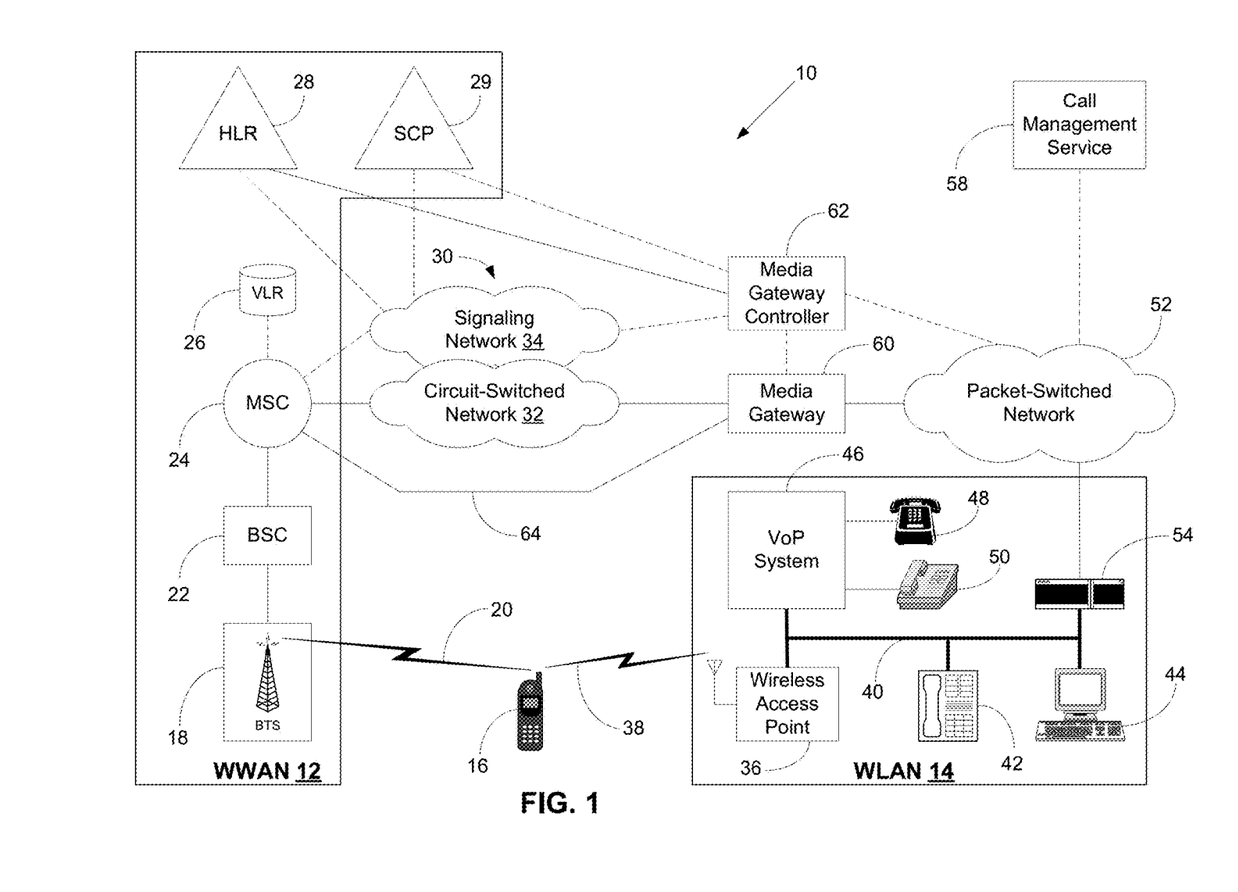
FIG. 1 is a simplified block diagram of a wireless telecommunications system, in accordance with an exemplary embodiment of the present invention.

FIG. 1 is a simplified block diagram of an exemplary wireless telecommunications system 10. In FIG. 1, connections that carry voice or other media are shown as solid lines and connections that carry primarily signaling are shown as dashed lines.

Wireless telecommunications system 10 includes network elements that function together as a wireless wide area network (WWAN) 12 and network elements that function together as a wireless local area network (WLAN) 14. WWAN 12 may provide wireless coverage in a relatively large geographic area, such as an entire city, often by using a plurality of contiguous wireless coverage areas, such as cells or sectors. The wireless communication in WWAN 12 may occur in an analog format, such as the Advanced Mobile Phone Service (AMPS), or in a digital format, such as code division multiple access (CDMA), time division multiple access (TDMA), or Global System for Mobile communication (GSM), and it may occur in licensed frequency bands, such as the 1.9 GHz PCS bands.

WLAN 14 may provide wireless coverage in a relatively limited area, as compared to WWAN 12, such as in a building or part of a building. In addition, WLAN may use one or more unlicensed frequency bands, such as the unlicensed frequency band in the 2.4 GHz range.

A multi-mode mobile station 16 is able to wirelessly communicate with WWAN 12 and with WLAN 14. More particularly, multi-mode mobile station 16 is able to communicate with WWAN 12 when operating in an area served by WWAN 12 and is able to communicate with WLAN 14 when operating in an area served by WLAN 14. In some areas, the wireless coverage of WWAN 12 and WLAN 14 may be overlapping, and multi-mode mobile station 16 may use an arbitration method to determine whether to communicate with WWAN 12, with WWAN 14, or with both. Multi-mode mobile station 16 may be a wireless telephone, wirelessly-equipped personal digital assistants (PDA), wirelessly-equipped laptop computer, or other type of wireless communication device.

WWAN 12 may include a base transceiver station (BTS) 18 that provides a wireless coverage area within which BTS 18 may communicate with one or more mobile stations, such as multi-mode mobile station 16, over an air interface 20. Although FIG. 1 shows only BTS 18, WWAN 12 may include a plurality of BTSs that may provide a plurality of wireless coverage areas. The communications between BTS 18 and multi-mode mobile station 16 may occur in a digital format, such as CDMA, TDMA, GSM, or they may occur in an analog format, such as AMPS. The communications could be voice only, data only (e.g., using EV-DO), or may include a combination of voice and data (e.g., using EV-DV). A preferred wireless communications format is cdma2000 such as described in EIA/TIA/IS-2000 Series, Rev. A (published March 2000), which is incorporated herein by reference.

BTS 18 may be controlled by a base station controller (BSC) 22, which, in turn, may be controlled by a mobile switching center (MSC) 24. Although FIG. 1 shows only one MSC and only one BSC, WWAN 12 may include a plurality of MSCs, which may, in turn, control a plurality of BTSs, via a plurality of BSCs. MSC 24 also has access to a visitor location register (VLR) 26. VLR 26 stores data records for mobile stations, such as multi-mode mobile station 16, that are being served by MSC 24. A data record stored in VLR 26 for a mobile station typically identifies the mobile station, e.g., by mobile identification number (MIN), mobile directory number (MDN), mobile station identification (MSID), and/or electronic serial number (ESN). The data record may also include status information for the mobile station, such as whether the mobile station is busy, and may also include a service profile that identifies the services to which the mobile station subscribes. The data record may also include other information relating to the mobile station. Although FIG. 1 shows VLR 26 as a network element separate from MSC 24, VLR 26 may be integrated or co-located with MSC 24.

In the example shown in FIG. 1, WWAN 12 is the "home" network of multi-mode mobile station 16, in that WWAN 12 includes a home location register (HLR) 28 associated with multi-mode mobile station 16. HLR 28 stores a data record for multi-mode mobile station 16. The data record stored in HLR 28 for multi-mode mobile station 16 identifies multi-mode mobile station 16, such as by MDN, MIN, MSID, and/or ESN and includes a last known location of multi-mode mobile station 16, e.g., identifies the VLR that most recently registered multi-mode mobile station 16 with HLR 28. The data record may also include status information for multi-mode mobile station 16, a service profile for multi-mode mobile station 16, and other information relating to multi-mode mobile station 16. WWAN 12 may also include a service control point (SCP) 29. SCP 29 may include service logic that specifies how to provide telecommunications services to mobile stations such as multi-mode mobile station 16.

MSC 24 is connected to the public switched telephone network (PSTN) 30. PSTN 30 may use an out-of-band signaling system, such as Signaling System 7 (SS7) to route calls. Thus, PSTN 30 may include a circuit-switched network 32 that carries bearer traffic, i.e., the voice or other media in calls, and a signaling network 34 that carries signaling traffic used to set up, tear down, monitor, and control calls. Circuit-switched network 32 may include a plurality of trunks, with each trunk carrying media in a pulse code modulation (PCM) format in a plurality of time-domain multiplexed channels. Signaling system 34 may include a plurality of networked signal transfer points (STPs).

MSC 24 may communicate with signaling network 34, e.g., using SS7, to route calls via circuit-switched network 32 to and from mobile stations being served by WWAN 12, such as multi-mode mobile station 16. To provide telecommunications services to mobile stations being served by WWAN 12, such as multi-mode mobile station 16, MSC 24 may also communicate with HLR 28 and SCP 29 via signaling network 34. The communications between MSC 24 and HLR 28 may conform to IS-41 specifications. A recent revision of the IS-41 specifications, ANSI/TIA/EIA-41-D-97, published in December 1997, is incorporated herein by reference. The communications between MSC 24 and SCP 29 may conform to the specification "Wireless Intelligent Network," TIA/EIA/IS-771, published in July 1999, which is incorporated herein by reference. The IS-41 and IS-771 signaling may be carried in an SS7 application layer in signaling network 34.

Using SS7, IS-41, IS-771, and/or other signaling carried in signaling network 34, MSC 24 may connect incoming calls from PSTN 30 to multi-mode mobile station 16, which calls may originate from calling parties using landline telephones, mobile stations, or other communication devices. Similarly, MSC 24 may use SS7, IS-41, IS-771, and/or other signaling carried in signaling network 34 to route calls originating from multi-mode mobile station 16 through PSTN 30. In addition, MSC 24 may be a "home" MSC of multi-mode mobile station 16, in that multi-mode mobile station 16 may have a mobile directory number (MDN) that is assigned to MSC 24. Thus, calls placed to this MDN may be routed to MSC 24 by PSTN 30.

WLAN 14 includes at least one wireless access point 36. Wireless access point 36 provides a wireless coverage area within which wireless access point 36 is able to communicate with wireless communication devices, such as multi-mode mobile station 16, over an air interface 38. More particularly, wireless access point 36 may communicate with multi-mode wireless communications devices, e.g., that are able to communicate with both a WWAN, such as WWAN 12, and a WLAN, such as WLAN 14. Wireless access point 36 may also communicate with wireless communication devices that may only be able to communicate with WLANs such as WLAN 14. The wireless communication between wireless access point 36 and multi-mode mobile station 16 may conform to or make use of IEEE 802.11a, IEEE 802.11b, IEEE 802.11e, IEEE 802.11g, or IEEE 802.11h standards (referred to generally herein as "802.11x"), or variations thereof. These 802.11x standards are incorporated herein by reference. Alternatively or additionally, the wireless communication may conform to or make use of IEEE 802.16 standards, Bluetooth specifications, HomeRF specifications, of HiperLAN standards, or may occur in a cordless communication format or a Multichannel Multipoint Distribution Service (MMDS) format, or may involve some other wireless protocol or format.

Wireless access point 36 may be communicatively coupled to other network elements, via a local area network (LAN) 40. LAN 40 may carry voice, data, and/or other media in a packet-based format. Thus, LAN 40 may be connected to other communication devices that exchange voice in a packet-based format. For example, LAN 40 may be connected to a voice-over-packet (VoP) telephone 42, a personal computer 44 equipped for audio communication, e.g., equipped with a microphone and speaker, and/or one or more other wireless access points.

LAN 40 may also be connected to a VoP system 46 that controls VoP communications in WLAN 14. VoP system 46 may, for example, function as a private branch exchange, such as an "IP-PBX," and/or a media terminal adapter (MTA). VoP system 46 may, in turn, be communicatively coupled to a variety of wireline and/or wireless communication devices. For example, VoP system 46 may be connected to analog telephony devices, such as analog telephone 48, facsimile machines, and/or modems. VoP system 46 may also be connected to digital telephony devices, such as digital telephone 50.

LAN 40 is communicatively coupled to a packet-switched network 52, via a network access device 54. Network access device 54 may be a cable modem, DSL modem, or router, for example. Packet-switched network 52 may include one or more local area networks (LANs) and/or one or more wide area network (WANs), such as the Internet. Packet-switched network 52 may route packets using a network protocol, such as the Internet Protocol (IP), in combination with the User Datagram Protocol (UDP) or Transmission Control Protocol (TCP). The IP packets may be carried over lower level protocols, such as asynchronous transfer mode (ATM) protocols. Protocols, such as the Real-Time Transport Protocol (RTP), may be used to carry voice or other media through packet-switched network 52 in a real-time format. Relevant aspects of RTP are described in Schulzrinne, et al., "RTP: A Transport Protocol for Real-Time Applications," Request for Comments 1889 (January 1996), which is incorporated herein by reference.

Other protocols, such as the Session Initiation Protocol (SIP) or the Session Initiation Protocol for Telephones (SIP-T), may be used to set up and/or manage communication sessions through packet-switched network 52. Voice, data, and/or other media may be exchanged in such communication sessions. Relevant aspects of SIP are described in Rosenberg, et al., "SIP: Session Initiation Protocol," Request for Comments 3261 (June 2002), which is incorporated herein by reference. Relevant aspects of SIP-T are described in Vemuri, et al., "Session Initiation Protocol for Telephones (SIP-T): Context and Architectures," Request for Comments 3372 (September 2002), which is incorporated herein by reference. SIP and/or other protocols may, in turn, use the Session Description Protocol (SDP) to describe the communication sessions that are being set up or managed. Relevant aspects of SDP are described in M. Handley, et al., "SDP: Session Description Protocol," Request for Comments 2327 (April 1998), which is incorporated herein by reference.

In an exemplary embodiment, SIP is used to set up communication sessions through packet-switched network 52 that involve WLAN 14. WLAN 14 may include one or more SIP user agents for this SIP signaling. For example, VoP system 46 may include a SIP user agent to engage in SIP signaling on behalf of multi-mode mobile station 16 or other communication devices communicatively coupled to WLAN 14. Alternatively, multi-mode mobile station 16 may have its own SIP user agent.

A call management service 58 may control calls and other communication sessions in packet-switched network 52 that involve WLAN 14. For example, if SIP is used to establish, tear down, or otherwise manage calls through packet-switched network 52, call management service 58 may function as a SIP proxy server and SIP registrar for WLAN 14. Thus, a SIP user agent in multi-mode mobile station 16, or in WLAN 14 on behalf of multi-mode mobile station 16, may engage in SIP signaling with call management service 58 to register multi-mode mobile station 16 and to originate and terminate communication sessions through packet-switched network 52 for multi-mode mobile station 16. Call management service 58 may also perform other functions. Although FIG. 1 shows call management service 58 as a separate network element, call management service 58 may be integrated with another network element, such as a media gateway controller.

Packet-switched network 52 may be communicatively coupled to circuit-switched network 32 via a media gateway 60. Media gateway 60 may convert between media formats used in circuit-switched network 30 and packet-switched network 52. For example, media gateway 60 may receive media from circuit-switched network 32 in a PCM format and convert the media into an RTP format for transmission over packet-switched network 52, and vice-versa.

A media gateway controller 62 may control media gateway 60 via a signaling link, e.g., using the Media Gateway Control Protocol (MGCP). Relevant aspects of MGCP are described in F. Andreason, et al., "Media Gateway Control Protocol (MGCP) Version 1.0," Request for Comments 3435 (January 2003), which is incorporated herein by reference. Media gateway controller 62 may be connected to signaling network 34 and to packet-switched network 52. Media gateway controller 62 may engage in SS7 or other signaling to route calls to and from media gateway 60 through PSTN 30, and media gateway controller may use SIP and/or other protocols to route calls to and from media gateway 60 through packet-switched network 52.

Thus, media gateway controller 62 may function as a signaling gateway, converting between legacy signaling protocols, such as SS7, IS-41, and/or IS-771, and voice-over-packet signaling protocols, such as SIP, SIP-T, and/or H.323. The conversions performed by media gateway controller 62 may involve encapsulation/de-encapsulation of messages and/or translation of messages, i.e., mapping between message types and message parameters. Media gateway controller 62 may also perform other functions. For example, call management service 58 may be a part of media gateway controller 62.

Calls may reach media gateway 60 via PSTN 30 by routing to a directory number assigned to media gateway 60. Media gateway controller 62 may associate the directory number with one or more endpoints that are accessible via packet-switched network 52, e.g., a communication device in WLAN 14. Thus, a call to a directory number assigned to media gateway 60 may then be routed from media gateway 60 through packet-switched network 52 to reach the corresponding endpoint.

However, calls may also reach media gateway 60 in other ways. For example, media gateway 60 may be integrated with other network elements, such as MSC 24. As a result, if a call is routed through PSTN 30 to MSC 24, e.g., based on a directory number assigned to MSC 24, then MSC 24 may not need to send the call again through PSTN 30 in order to have the call reach packet-switched network 52. Instead, MSC 24 may use media gateway 60 integrated with it to send the call directly to packet-switched network 52. As another example, media gateway 60 may be connected to MSC 24 via an intermachine trunk (IMT) 64. In that case, MSC 24 may use a trunk and port number of IMT 64, instead of a directory number, to send a call to media gateway 60.

2. EXEMPLARY MULTI-MODE MOBILE STATION

Figure 2:
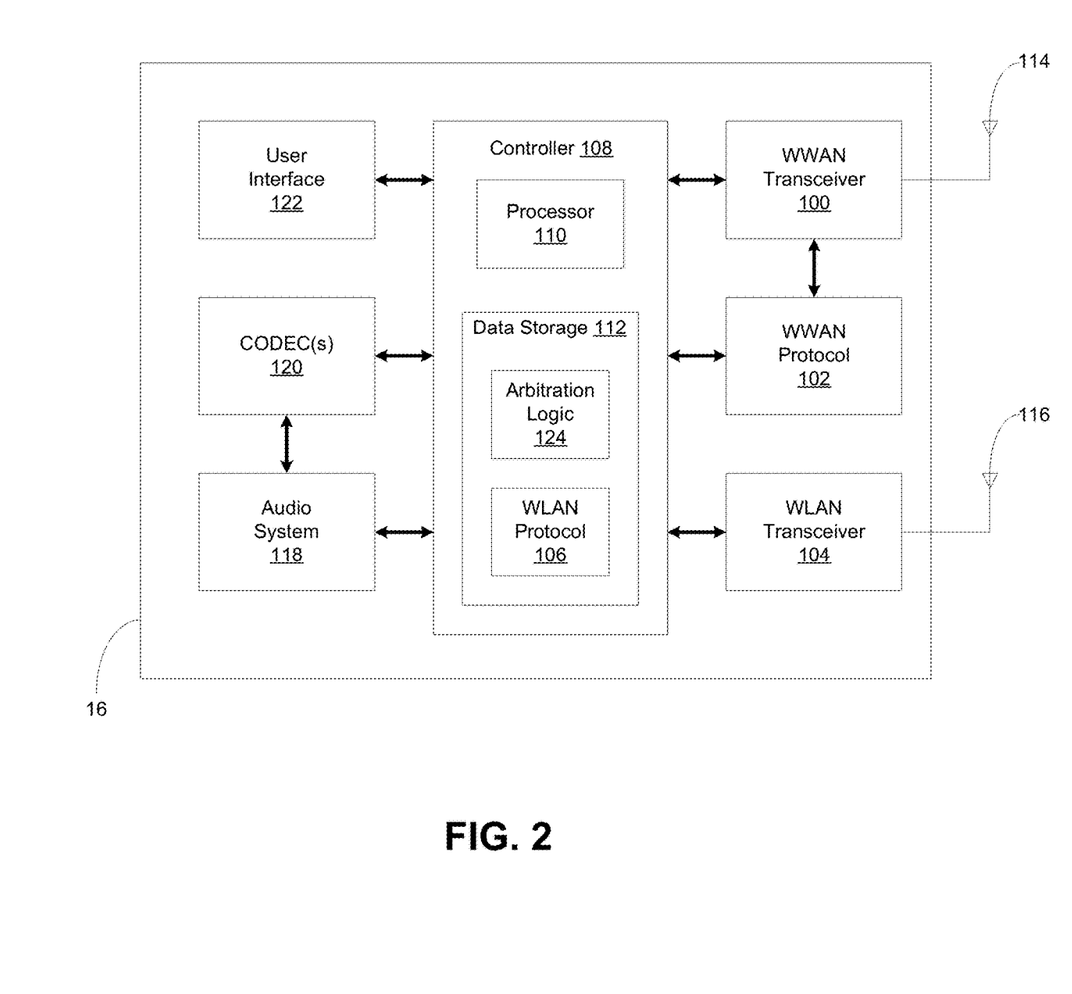
FIG. 2 is a simplified block diagram of a multi-mode mobile station, in accordance with an exemplary embodiment of the present invention.

FIG. 2 is a simplified block diagram of multi-mode mobile station 16, in accordance with an exemplary embodiment. Multi-mode mobile station 16 includes a plurality of interfaces that allow multi-mode mobile station 16 to communicate using a plurality of different wireless access technologies. Each interface may include a radio frequency (RF) transceiver and a communication module for a particular wireless access technology. In the example shown in FIG. 2, multi-mode mobile station 16 includes a WWAN transceiver 100 and a WWAN protocol module 102, for wireless communication using a WWAN protocol, and a WLAN transceiver 104 and a WLAN protocol module 106, for wireless communication using a WLAN protocol. The WWAN protocol is a wireless communication protocol, such as CDMA, TDMA, or GSM, used to communicate with a WWAN, such as WWAN 12. In an exemplary embodiment, the WWAN protocol is a CDMA protocol, e.g., conforming to IS-95 or cdma2000 specifications. The WLAN protocol is a wireless communication protocol used to communicate with a WLAN, such as WLAN 14. In an exemplary embodiment, the WLAN protocol is an 802.11x protocol. Alternatively, the WLAN protocol, may use Bluetooth, HomeRF, Hiper-LAN, or MMDS.

Multi-mode mobile station 16 may be controlled by a controller 108, which may include a processor 110 and data storage 112. Data storage 112 may include volatile memory, such as RAM, and/or non-volatile memory, such as ROM or flash memory. Data storage 112 may store a plurality of machine language instructions that are executed by processor 110 to control some of the operations of multi-mode mobile station 16, such as the operations of WWAN transceiver 100 and WLAN transceiver 104, as described in more detail below.

WWAN transceiver 100 transmits and receives wireless signals that use the WWAN protocol, e.g., via an antenna 114. WLAN transceiver 104 transmits and receives wireless signals that use the WLAN protocol, e.g., via an antenna 116. Although FIG. 2 shows WWAN transceiver 100 and WLAN transceiver 104 with separate antennas, these transceivers may share the same antenna in some embodiments.

WWAN protocol module 102 processes signals received by WWAN transceiver 100 in accordance with the WWAN protocol and processes signals in accordance with the WWAN protocol for transmission by WWAN transceiver 100. The processing performed by WWAN protocol module 102 may correspond to the physical layer of the WWAN protocol. However, WWAN protocol module 102 may also perform functions that correspond to the data link layer and higher layers of the WWAN protocol. WWAN protocol module 102 may be implemented using hardware, software, and/or firmware. For example, if the WWAN protocol is CDMA, then WWAN protocol module 102 may include a CDMA chipset.

WLAN protocol module 106 processes signals received by WLAN transceiver 104 in accordance with the WLAN protocol and processes signals in accordance with the WLAN protocol for transmission by WLAN transceiver 104. More particularly, WLAN protocol module 106 may make use of a protocol stack that includes a WLAN protocol, such as 802.11x. The WLAN protocol may comprise the lowest layers of the protocol stack, e.g., the physical and data link layers in the Open Standards Institute (OSI) model. WLAN protocol module 106 may also make use of higher-level protocols. For example, module 106 may use a network layer protocol, such as the Internet Protocol (IP) and a transport layer protocol, such as the User Datagram Protocol (UDP) and/or the Transmission Control Protocol (TCP). Module 106 may also include a protocol, such as the Real-Time Transport Protocol (RTP), for sending and receiving packetized media, such as VoP, in real-time media sessions. Module 106 may also include one or more application layer protocols for managing communication sessions. Such application layer protocols could include open-standard protocols, such as SIP or H.323, and/or proprietary protocols, such as Cisco's Skinny Client Control Protocol or Nortel's Unistem protocol. WLAN protocol module 106 may be implemented using hardware, software, and/or firmware. For example, as shown in FIG. 2, WLAN protocol module 106 may be a software module stored in data storage 112.

Multi-mode mobile station 16 may include an audio system 118 to convey audio, such as voice, to and from a user. Audio system 118 may include one or more microphones and speakers, which may be either internal or external. Audio system 118 may be coupled to one or more codecs 120 to convert audio signals between an analog format used by audio system 118 and one or more digital formats used by one or more of modules 102 and 106. The digital formats may include Enhanced Variable Rate Vocoder (EVRC), Selectable Mode Vocoder (SMV), G.711, G.721, G.726, G.729, and/or other formats. Codec(s) 120 may convert audio signals in different ways, e.g., using different digital formats, for different ones of modules 102 and 106. In this way, modules 102 and 106 are able to convey speech and other audio to and from the user in the WWAN and WLAN communication modes, respectively. In some embodiments, modules 102 and/or 106 may also be able to convey data, graphics, video, and/or other media.

Multi-mode mobile station 16 may also include a user interface 122 coupled to controller 108. User interface 122 may include one or more input devices, such as keys, buttons, switches, touch screens, and/or other components with which a user may provide input to multi-mode mobile station 16. User interface 122 may also include one or more output devices, such as lights, display screens, ringers, buzzers, vibration mechanisms, and/or other components that provide a user-discernible output.

Multi-mode mobile station 16 also includes arbitration logic 124 that controls whether multi-mode mobile station 16 communicates using the WWAN protocol, i.e., using WWAN transceiver 100 and WWAN protocol module 102, or using the WLAN protocol, i.e., using WLAN transceiver 104 and WLAN protocol module 106. As described in more detail below, arbitration logic may also control what steps multi-mode mobile station 16 takes when changing from the WWAN protocol communication mode to the WLAN protocol communication mode, or vice versa, as described in more detail below. Arbitration logic 124 may be implemented using hardware, software, and/or firmware. For example, as shown in FIG. 2, arbitration logic 124 may be a software module stored in data storage 112.

3. EXEMPLARY OPERATION

Figure 3:
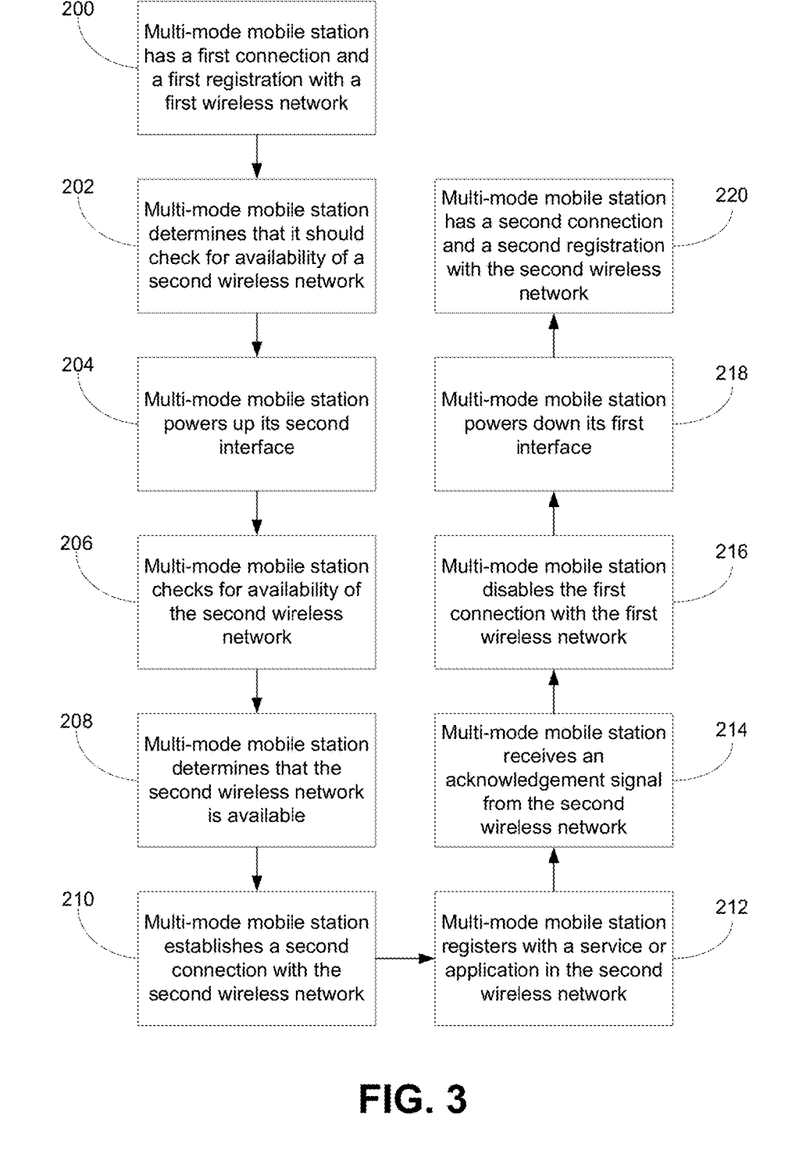
FIG. 3 is a flow chart illustrating a method of changing the network connectivity of the multi-mode mobile station of FIG. 2, in accordance with an exemplary embodiment of the present invention.

FIG. 3 is a flow chart illustrating a process for changing the network connectivity of multi-mode mobile station 16, in accordance with an exemplary embodiment. The process may begin with multi-mode mobile station 16 having a first connection and a first registration with a first wireless network, as indicated by block 200. In this state, multi-mode mobile station 16 is communicatively coupled to the first wireless network such that multi-mode mobile station 16 can, using its first interface, transmit and/or receive voice, data, or other media (depending on what services it is registered for) via the first wireless network.

The first connection makes use of a first wireless access technology and the first interface of multi-mode mobile station 16. The first wireless network could be WWAN 12 or WLAN 14, for example. Thus, if the first wireless network is WWAN 12, the first wireless access technology could be CDMA or other WWAN protocol, and the first interface could include WWAN transceiver 100. If the first wireless network is WLAN 14, the first wireless access technology could be 802.11x or other WLAN protocol, and the first interface could include WLAN transceiver 104. For much of the time when multi-mode mobile station 16 has this first connection with the first wireless network, the second interface of multi-mode mobile station 16 may remain in a powered down state. The powered down state could be a state in which the second interface is completely off, or the powered down state could be a state in which the second interface is in a low-power or sleep mode. However, multi-mode mobile station 16 may, at certain times, power up the second interface to check for the availability of the second wireless network, as described in more detail below.

The first connection makes use of a first wireless access technology and the first interface of multi-mode mobile station 16. The first wireless network could be WWAN 12 or WLAN 14, for example. Thus, if the first wireless network is WWAN 12, the first wireless access technology could be CDMA or other WWAN protocol, and the first interface could include WWAN transceiver 100. If the first wireless network is WLAN 14, the first wireless access technology could be 802.11x or other WLAN protocol, and the first interface could include WLAN transceiver 104. For much of the time when multi-mode mobile station 16 has this first connection with the first wireless network, the second interface of multi-mode mobile station 16 may remain in a powered down state. The powered down state could be a state in which the second interface is completely off, or the powered down state could be a state in which the second interface is in a low-power or sleep mode. However, multi-mode mobile station 16 may, at certain times, power up the second interface to check for the availability of the second wireless network, as described in more detail below.

While multi-mode mobile station 16 has the first connection with the first wireless network, multi-mode mobile station 16 may determine that it should check for availability of the second wireless network, as indicated by block 202. Multi-mode mobile station 16 may use a number of different methods to determine when to check for availability of the second wireless network. In some cases, multi-mode mobile station 16 may periodically check for availability, or may do so at the instance of the user. Alternatively, a triggering event may cause multi-mode mobile station 16 to determine that it should check for availability of the second wireless network. For example, multi-mode mobile station 16 may use information about its location or movement to determine when to check for availability of the second wireless network. Examples of such approaches are described in U.S. patent application Ser. No. 10/391,158, filed Mar. 18, 2003, titled "Method for Determining Availability of a Radio Network," and in U.S. patent application Ser. No. 10/629,406, filed Jul. 29, 2003, titled "Method for Determining Availability of a Radio Network," which applications are incorporated herein by reference.

In order to check for availability of the second wireless network, multi-mode mobile station 16 may power up its second interface, as indicated by block 204. Multi-mode mobile station 16 then checks for availability of the second wireless network, as indicated by block 206. Checking for availability may involve checking for radio frequency (RF) emissions of the type used by the second wireless network. As a result of this checking, multi-mode mobile station 16 may determine that the second wireless network is available, as indicated by block 208.

Multi-mode mobile station 16 then establishes a second connection with the second wireless network, as indicated by block 210. The process of establishing the second connection may involve association and authentication steps, as described in more detail below. Multi-mode mobile station 16 may then register with a service or application in the second wireless network, as indicated by block 212. Before registering with the second wireless network, multi-mode mobile station 16 may determine that the second wireless network is preferred over the first wireless network.

The determination that the second wireless network is preferred could be based on pre-set user preferences and/or could depend on various criteria, such as the quality of the link and/or the availability of desired services (e.g., voice service) using the second wireless network. For example, to determine whether the second wireless network is preferred, the multi-mode mobile station 16 may check whether a desired service, e.g., voice service, is available via the second wireless network. Multi-mode mobile station 16 may also check whether the connection with second wireless network has sufficient quality to handle the desired service. If these criteria are met, then pre-set user preferences may indicate that the second wireless network is preferred.

Once multi-mode mobile station 16 has successfully registered with a service or application in the second wireless network, multi-mode mobile station 16 may receive an acknowledgement signal from the second wireless network, as indicated by block 214. The acknowledgement signal may come from the network element with which multi-mode mobile station 16 registered for services or from some other network element. For example, if the second wireless network is a WWAN, such as WWAN 12, HLR 28 may send an IS-41 regnot return result, indicating successful registration, to MSC 24. MSC 24 may then cause a registration acknowledgement to be transmitted to multi-mode mobile station 16, e.g., over air interface 20. If the second wireless network is a WLAN 14, then call management service 58 may transmit a 200 OK message, indicating a successful response to a SIP REGISTER message, to VoP system 46. VoP system 46 may then cause an acknowledgement signal to be transmitted to multi-mode mobile station 16, e.g., over air interface 38. Alternatively, call management service 58 may send an acknowledgement signal directly to multi-mode mobile station 16.

In response to the acknowledgement signal of block 214, multi-mode mobile station 16 may disable the first connection with the first wireless network, as indicated by block 216, and may power down its first interface, as indicated by block 218. The steps involved in disabling the first connection with the first wireless network are described in more detail below. Powering down the first interface may involve turning off the first interface completely, or it may involve putting the first interface into a low-power or sleep mode. In this way, multi-mode mobile station 16 may conserve power. Multi-mode mobile station 16 may, however, power up the first interface at certain times to check for the availability of the first wireless network.

At that point, multi-mode mobile station 16 has a second connection and a second registration with the second wireless network, as indicated by block 220. Thus, multi-mode mobile station 16 is communicatively coupled to the second wireless network, and multi-mode mobile station 16 can, using its second interface, transmit and/or receive voice, data, or other media (depending on what services multi-mode mobile station 16 is registered for) via the second wireless network.

The process of establishing the second connection and the second registration with the second wireless network may involve one or more steps, depending on the second wireless network and/or the wireless access technology that multi-mode mobile station 16 uses to communicate with the second wireless network. For example, the process may involve: (a) multi-mode mobile station 16 associating itself with a wireless element of the second wireless element; (b) multi-mode mobile station 16 authenticating itself for access to radio resources in the second wireless network; and (c) multi-mode mobile station 16 registering itself for communication services via the second wireless network. These three steps are discussed in more detail below for two illustrative examples: (i) an example in which the second wireless network is a WLAN, such as WLAN 14, that uses an 802.11x protocol; and (ii) an example in which the second wireless network is a WWAN, such as WWAN 12, that uses CDMA.

If the second wireless network is a WLAN, such as WLAN 14, that uses an 802.11x protocol, then multi-mode mobile station 16 may associate with a wireless access point, such as wireless access point 36. To associate with wireless access point 36, multi-mode mobile station 16 may transmit an association request to wireless access point 36. The association request may include a MAC address of multi-mode mobile station 16, a MAC address of wireless access point 36, the capabilities of multi-mode mobile station 16, and/or other information. In response, wireless access point 36 may send multi-mode mobile station 16 an association response that indicates whether association was successful.

Once multi-mode mobile station 16 has associated with wireless access point 36, multi-mode mobile station 16 may authenticate itself to WLAN 14. The authentication process may use a Wired Equivalent Privacy (WEP) algorithm, WPA, WPA2, 802.1x, or some other privacy or security service. Alternatively, or the authentication process may be an "open system" process in which the identity provided by multi-mode mobile station 16 is not verified. In the WEP approach, the authentication process may begin with multi-mode mobile station 16 transmitting an authentication request to wireless access point 36 that identifies multi-mode mobile station 16. Wireless access point 36 may then respond with its own identity and may provide a "challenge text" for multi-mode mobile station 16 to encrypt and thereby prove its identity. Multi-mode mobile station 16 encrypts the challenge text using its WEP key and sends the result back to wireless access point 36. Wireless access point 36 may then decrypt the encrypted text to determine whether or not multi-mode mobile station 16 has a valid WEP key. Wireless access point 36 may then transmit an authentication result to multi-mode mobile station 16 that indicates whether multi-mode mobile station 16 has been successfully authenticated.

After successful association and authentication, multi-mode mobile station 16 may begin exchanging data frames with wireless access point 36. However, in order to have access to certain types of communication services, e.g., sending or receiving voice calls via WLAN 14, multi-mode mobile station 16 may then need to register itself for such communication services with an appropriate "register." The register involved may depend on the type of communication service, on the architecture of WLAN 14, and/or other factors. The register could be VoP system 46 or call management service 58, for example. To register, multi-mobile station 16 may transmit a service registration message to the register or to another network element that then sends a service registration message to the register on behalf of multi-mode mobile station 16. The service registration message may identify multi-mode mobile station 16, such as by IP address and/or MAC address or in some other manner. The service registration message may conform to a protocol such as SIP, H.323, or Cisco's Skinny Client Control Protocol, for example. Other protocols could be used, however. Thus, in one exemplary embodiment, multi-mode mobile station 16 may use H.323 to transmit a service registration message to VoP system 46 to register with VoP system 46. In response, VoP system 46, may then transmit a SIP REGISTER message to call management service 58 to register multi-mode mobile station 16 with call management service 58. In another exemplary embodiment, multi-mode mobile station 16 may itself transmit a SIP REGISTER message to call management service 58.

If the second wireless network is a WWAN, such as WWAN 12, then multi-mode mobile station 16 may transmit a registration message to a base station, such as BTS 18. The registration message may perform all of the authentication, association, and registration functions. With respect to authentication, the registration message transmitted by multi-mode mobile station 16 may include an authentication result that serves to authenticate multi-mode mobile station 16 for access to radio resources. In an exemplary embodiment, the authentication result may be generated, using an encryption algorithm, based on a random number transmitted by BTS 18, an electronic serial number and identification number of multi-mode mobile station 16, and on shared secret data. To authenticate multi-mode mobile station 16, BTS 18 may provide the authentication result from multi-mode mobile station 16 to MSC 24. MSC 24 may then transmit an IS-41 AUTHREQ (authentication request) message with the authentication result to an authentication center, e.g., HLR 28, via VLR 26. HLR 28, acting as the authentication center, may generate its own authentication result and compare it to the authentication result from multi-mode mobile station 16. If the authentication results match, then HLR 28 may send a positive authentication result back to MSC 24.

With respect to registration, upon successful authentication, MSC 24 may then transmit an IS-41 REGNOT (registration notification) message to HLR 28, via VLR 26 to register multi-mode mobile station 16. In this way, multi-mode mobile station 16 may become registered with VLR 26 and HLR 28 and, thus, eligible to use WWAN 12 for communication services.

With respect to association, multi-mode mobile station 16 may transmit the registration message on an access channel of a particular wireless network element, e.g., BTS 18. Thus, upon successful registration, multi-mode mobile station 16 will also be associated with BTS 18, i.e., multi-mode mobile station 16 will be able to communicate with WWAN 12 via BTS 18.

As noted above, after multi-mode mobile station 16 registers with the second wireless network and receives an acknowledgement indicating successful registration, multi-mode mobile station 16 may then disable the first connection with the first wireless network, as indicated by block 216. The process of disabling this first connection may involve one or more steps, depending on the first wireless network and/or the wireless access technology used for the first connection. In particular, disabling the first connection may involve: (a) multi-mobile station 16 de-registering itself from the first wireless network; (b) multi-mode mobile station 16 de-authenticating itself from the first wireless network; and (c) multi-mode mobile station 16 disassociating itself from the first wireless network. These three aspects of disabling the first connection are discussed in more detail below for two illustrative examples: an example in which the first wireless network is a WLAN, such as WLAN 14, that uses an 802.11x protocol; and an example in which the first wireless network is a WWAN, such as WWAN 12, that uses CDMA.

If the first wireless network is a WLAN, such as WLAN 14, that uses 802.11x, then to disable the first connection with the first wireless network, multi-mode mobile station 16 may transmit a de-registration message to each service to which multi-mode mobile station 16 had registered using that first connection. The de-registration message may conform to a protocol such as SIP, H.323, or Cisco's Skinny Client Control Protocol, e.g., depending on what protocol is used for service registration. For example, a SIP REGISTER message with an expiration period of 0 may be used to de-register multi-mode mobile station 16. Other protocols could be used, however. Thus, in one exemplary embodiment, multi-mode mobile station 16 may use H.323 to transmit a de-registration message to VoP system 46. In response, VoP system 46, may then transmit a SIP REGISTER message, with an expiration period of 0, to call management service 58 to de-register multi-mode mobile station 16 from call management service 58. In another exemplary embodiment, multi-mode mobile station 16 may itself transmit a SIP REGISTER message with an expiration period of 0 to call management service 58. In addition to service de-registration, multi-mode mobile station 16 may also transmit a de-authentication message to de-authenticate itself from WLAN 14 and/or a disassociation message to disassociate itself from the wireless access point with which multi-mode mobile station 16 was associated.

If the first wireless network is a WWAN, such as WWAN 12, then multi-mode mobile station 16 may disable the first connection by transmitting a power-down registration message. In response to this power-down registration message, MSC 24 may transmit an IS-41 MSINACT message, with a deregistration parameter to HLR 28, via VLR 26. In this way, multi-mode mobile station 16 may be de-registered from VLR 26 and HLR 28.

4. CONCLUSION

Exemplary embodiments of the present invention have been described above. Those skilled in the art will understand, however, that changes and modifications may be made to these embodiments without departing from the true scope and spirit of the invention, which is defined by the claims.

The invention claimed is:

1. A method of changing network connectivity for a multi-mode mobile station, said multi-mode mobile station including a first interface for communicating with a first wireless network using a first wireless access technology and a second interface for communicating with a second wireless network using a second wireless access technology, said method comprising:

while said multi-mode mobile station has a first connection with said first wireless network, said first connection using said first interface and said first wireless access technology, said multi-mode mobile station:

(a) detecting a triggering event based on a location of said multi-mode mobile station;

(b) in response to said triggering event, powering up said second interface and checking for availability of said second wireless network;

(c) determining that said second wireless network is available;

(d) determining that said second wireless network is preferred over said first wireless network based on pre-set user preferences, wherein determining that said second wireless network is preferred over said first wireless network based on pre-set user preferences comprises determining that voice service is available via said second wireless network; and (e) establishing a second connection with said second wireless network, said second connection using said second interface and said second wireless access technology, wherein establishing a second connection with said second wireless network comprises said multi-mode mobile station registering for communication services on said second wireless network;

said multi-mode mobile station receiving an acknowledgement signal transmitted by said second wireless network, said acknowledgement signal indicating successful registration with said second wireless network; and in response to said acknowledgement signal, said multi-mode mobile station disabling said first connection and powering down said first interface, wherein disabling said first connection comprises said multi-mode mobile station de-registering from said first wireless network.

2. The method of claim 1, wherein determining that said second wireless network is preferred over said first wireless network based on pre-set user preferences further comprises:
determining that said second wireless network has sufficient quality to handle voice service.

3. The method of claim 1, wherein said first wireless network is a wireless wide area network (WWAN) and said second wireless network is a wireless local area network (WLAN).

4. The method of claim 3, wherein said first wireless access technology uses code division multiple access (CDMA) and said second wireless access technology uses an 802.11x protocol.

5. The method of claim 3, wherein said multi-mode mobile station registering for communication services on said second wireless network comprises said multi-mode mobile station transmitting a Session Initiation Protocol (SIP) REGISTER message, and wherein said acknowledgement signal comprises a 200 OK response to said SIP REGISTER message.

6. The method of claim 1, wherein said first wireless network is a wireless local area network (WLAN) and said second wireless network is a wireless wide area network (WWAN).

7. The method of claim 6, wherein said first wireless access technology uses an 802.11x protocol and said second wireless access technology uses code division multiple access (CDMA).

8. The method of claim 6, said multi-mode mobile station de-registering from said first wireless network comprises said multi-mode mobile station transmitting a Session Initiation Protocol (SIP) REGISTER message with an expiration period of 0.

9. The method of claim 1, wherein establishing a second connection with said second wireless network comprises:
said multi-mode mobile station authenticating itself for access to radio resources in said second wireless network.

10. The method of claim 1, wherein establishing a second connection with said second wireless network comprises:
said multi-mode mobile station associating itself with a wireless element of said second wireless network.

11. The method of claim 1, wherein disabling said first connection comprises:
said multi-mode mobile station de-authenticating itself from said first wireless network.

12. The method of claim 1, wherein disabling said first connection comprises:
said multi-mode mobile station disassociating itself from a said first wireless network.

13. A multi-mode mobile station comprising:
a first interface for communicating with a first wireless network using a first wireless access technology;
a second interface for communicating with a second wireless network using a second wireless technology; and
a controller for controlling said first and second interfaces, wherein said controller is configured to perform operations comprising (i) while said first interface has a first connection with said first wireless network, detecting a trigger event based on a location of said multi-mode mobile station and responsively using said second interface to check for availability of said second wireless network, (ii) determining that said second wireless network is available, (iii) determining that said second wireless network is preferred over said first wireless network based on pre-set user preferences, (iv) registering for communication services on said second wireless network, and (v) in response to receiving from said second wireless network an acknowledgement signal indicating successful registration, disabling said first connection and powering down said first interface, wherein disabling said first connection comprises de-registering from said first wireless network, and wherein determining that said second wireless network is preferred over said first wireless network based on pre-set user preferences comprises determining that voice service is available via said second wireless network.

14. The multi-mode mobile station of claim 13, wherein said first wireless network is a wireless wide area network (WWAN) and said second wireless network is a wireless local area network (WLAN).

15. The multi-mode mobile station of claim 14, wherein registering for communication services on said second wireless network comprises using said second interface to transmit a Session Initiation Protocol (SIP) REGISTER message, and wherein said acknowledgement signal comprises a 200 OK response to said SIP REGISTER message.

16. The multi-mode mobile station of claim 13, wherein said first wireless network is a wireless local area network (WLAN) and said second wireless network is a wireless wide area network (WWAN).

17. The multi-mode mobile station of claim 13, de-registering from said first wireless network comprises using said first interface to transmit a Session Initiation Protocol (SIP) REGISTER message with an expiration period of 0.

\* \* \* \* \*